July 18, 1933.  A. F. VICTOR  1,918,724
PROJECTING MOTION PICTURES IN COLOR
Filed March 4, 1929
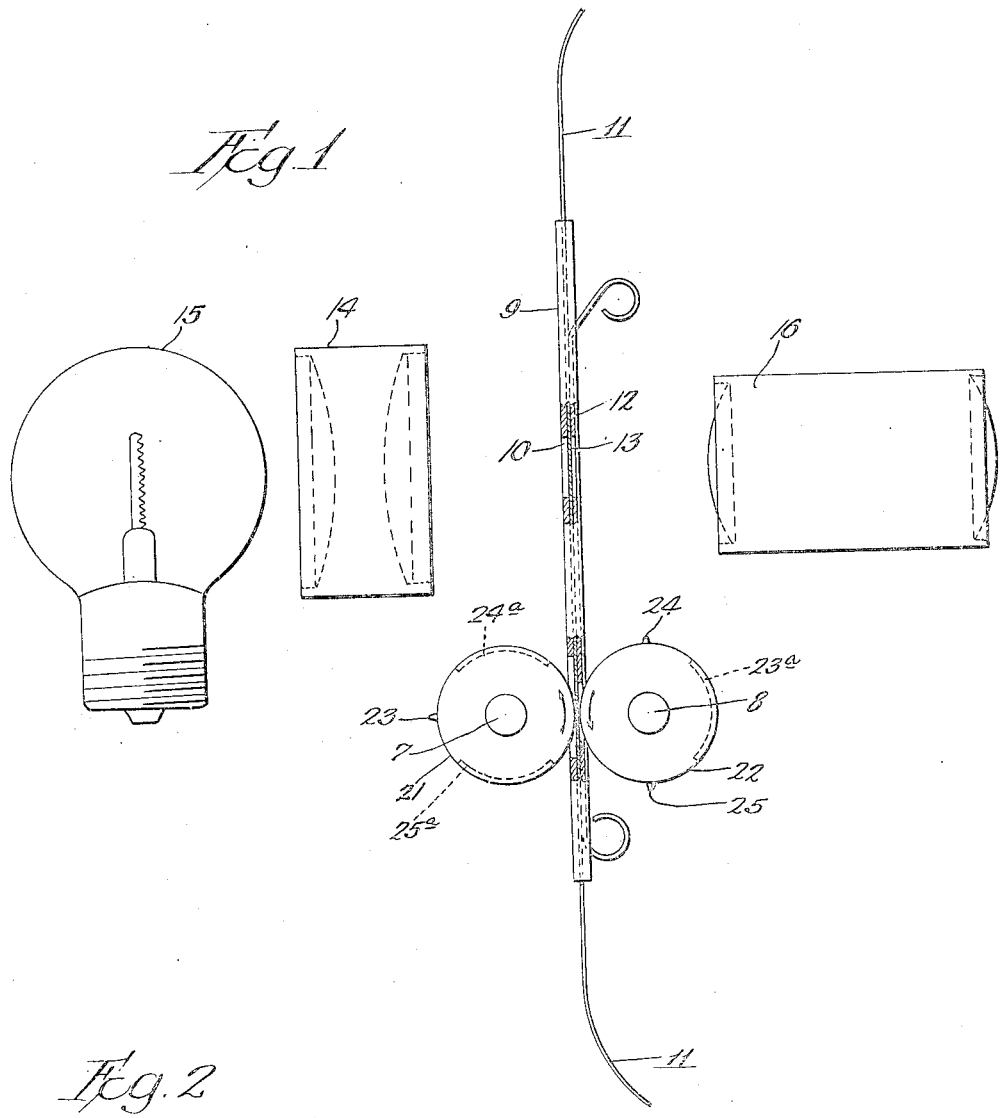
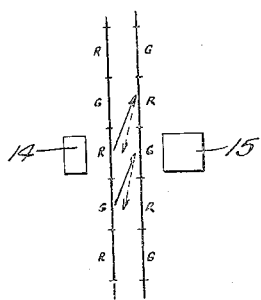
Inventor:
ALEXANDER FERDINAND VICTOR Patented July 18, 1933

1,918,724

UNITED STATES PATENT OFFICE

ALEXANDER FERDINAND VICTOR, OF DAVENPORT, IOWA

PROJECTING MOTION PICTURES IN COLOR

Application filed March 4, 1929. Serial No. 344,108.

My invention relates to photography and has more particular reference to color photography or color cinematography. Specifically my invention relates to projection and viewing of motion pictures or "still" pictures so as to produce a natural color to the images observed upon the screen.

I do not wish to confine my invention to motion pictures in colors alone, but also claim as new any method whereby a material, film or paper having two or more images differently colored may be vibrated during observation or projection so that the two or more images register and form in the eye through persistence of vision one single and colored image. In this manner it would be quite feasible to secure portraits of pictures that through vibration would appear a colored photograph when seen or projected. Merely for the purpose of convenience I will herein describe my method as applied to the cinematographic art, and it is understood that my so doing does not relinquish any of my rights to "still" pictures.

In color photography, for example, such as utilized in the motion picture art, it has been the practice to employ what are known as additive methods and subtractive methods in order to produce the colored pictures. My present method appertains more particularly to the additive method in which the color effect is secured through a succession of impressions upon the eye of two or more colors.

If primary colors are projected upon a screen in rapid succession the eye functions to blend the colors so that the natural effect is created. When two or more colors are rapidly projected on a screen the eye picking up one color impression immediately after the previous impression of a different color will, due to persistency of vision, blend this previous color into the last color seen with the result that the tones resulting thereby, according to the density of the colors in the alternate pictures will produce the illusion of the eye having seen all of the colors in the spectrum. This relative density of the primary colors is secured by photographing the pictures alternately through color screens for the alternate red and green frames.

It has been found that when the normal speed of sixteen (16) pictures per second in alternate colors are observed upon the screen, there have been flashes, for example, of red and green, due to the fact that the eye has become tired and it has failed to blend the red and green pictures together into the natural tones. This is commonly known as "color bombardments," and to overcome this the speed of projection has been increased to create approximately forty-eight (48) impressions per second. This, however, is an expensive method since it requires three times the length of film that is ordinarily required and there is an increased strain upon the projecting apparatus as well as the camera because of the fact that the pictures must be photographed at the same speed as they are to be projected. It is also well known that when color cameras are speeded up difficulty is met in securing exposures of sufficient duration to form the images since the color filters in the camera retard the formation of such photographic images on the negative film.

I have so devised my present method that the pictures may be taken at the same normal speed of sixteen (16) a second through alternate red and green color screens, and after the frames have been alternately tinted the film is fed through the projecting apparatus at the normal speed of sixteen (16) a second. However, while the film is moving at normal speed through the projector the frames are shifted back and forth longitudinally to such an extent that two adjacent pictures are exposed in rapid succession and at a speed faster than the normal feeding of the film so that each film is projected two or more times in alternation with the next frame.

My invention simplifies the taking and projecting of motion pictures so that they appear in colors on the screen and it is quite inexpensive to employ for the reason that it is possible for the amateur class of users to take ordinary motion-pictures at the normal speed and after the positive or projection film has been secured the pictures may be alternately colored red and green and then projected at the ordinary speed and during their projection at ordinary normal speed the pictures may be successively vibrated at a higher speed than that at which the film is being unrolled or fed.

After two differently colored pictures have been vibrated the desired number of times the succeeding picture is moved to the aperture and the film is again vibrated to alternately expose this new picture and an adjacent picture which is of a different color.

Instead of coloring the film, a revolving shutter may be employed having windows that interpose at the exact moment when the film is vibrated and synchronized so that the proper color appears through the proper exposure of the film pictures. It is also possible to use an oscillating shutter carrying the color filter, or to use a colored band having alternate green and red spaces which may be moved in front of the projection opening or light aperture. Another method would be to take two bands of pictures upon a film strip and tint one band red and the other green, the pictures being taken by shifting the film sidewise or transversely and, when projected, a similar sidewise or transverse movement would be given to the film at a speed faster than the normal feeding motion of the apparatus. With my method, in order to secure the relative tone values of the two colors, red and green, for the projection upon the screen, the camera that photographs the moving images is provided with the usual color filters or screens that will produce the successive pictures on the film in the proportionate tones of the complementary colors. After the positive film has been produced these alternately filtered frames are colored respectively red and green and is ready for projection in the manner herein described. The colored filters or screens may be upon a disk that rotates in front of the camera lens and moved at the same speed as, and synchronized with the shutter, so that the alternate filters will be in proper positions as the successive pictures are photographed.

It is obvious that any method of taking pictures may be employed and the film may be moved through the projector at the ordinary normal speed but it is given a vibratory movement back and forth either longitudinally or laterally so as to alternately expose two adjacent differently colored pictures. This will produce a very true colored impression without employing the high speed feed movement of the film heretofore employed, and it creates the impression to the observer of objects in their natural colors, and in motion when the principle is employed in cinematographic apparatus.

A conventional mechanism for carrying out my herein described method is schematically shown in the drawing in which Figure 1 shows the side of a typical structure and Figure 2 is a diagram showing the vibratory or back and forth movement of the film at the projection aperture.

The Figure 1 diagram shows a usual film guide 9 and projection aperture 10 past which the film strip 11 is intermittently moved, and there is shown in the film guide a presser-plate 12 with an aperture 13 alining with the guide aperture. These apertures are alined axially with a condenser lens unit through which light passes from the lamp 15, and there is a projector lens unit 16 on the opposite side of the guide that also alines axially with the apertures and condenser unit.

Conventional means to move the film at least two successive steps forward are shown at the right of the guide, such means are shown as a rotatable spool or sprocket 22 having diametrically opposite teeth 24 and 25 and there are annularly extending grooves or channels 23$^a$ in the flanges of the spool or sprocket. On the opposite side of the guide is a conventional means for reversing the movement of the film which is shown as a correspondingly shaped spool or sprocket 21 but having a single tooth 23 and two oppositely arranged annular grooves or channels 24$^a$ and 25$^a$. The spools or sprockets are rotated in the directions indicated by arrows by any suitable means and the respective teeth engage the usual film perforations by entering openings in the film guide and presser-plate, and are accommodated in the annular grooves or channel in the opposite spool or sprocket. Teeth 24 and 25 on sprocket 22 may be designated the "normal" feed teeth and move the film downward and the teeth 23 are the reversal teeth.

In operation; assuming that the frames or pictures upon the film have been alternately colored red and green after being photographed through corresponding filters or screens, (indicated by letters "R" and "G", Figure 2), it will be obvious that rotation of the sprocket 22 may be timed for "normal" speed. At "normal" speed of sixteen frames per second sprocket 22 will revolve eight times per second. The teeth 23 on sprocket 21 will engage the film eight times per second and move the film backward one frame each time as indicated by the solid-line arrows in Figure 2. Continuing this operation, the next normal feed teeth 24 (or 25) will intermittently return the film to its originally advanced position (as indicated by the dotted-line arrows Figure 2) and the film will be again advanced one frame by the next succeeding teeth on the sprocket 22.

The foregoing detailed description and illustrated disclosure have been given for the purpose of clearness of understanding only, and no unnecessary limitations are to be understood therefrom, but the appended claims should be construed as broadly as permissible in view of the prior art.

What is claimed is:—

1. The method of producing motion pictures which consists in projecting a picture at a light aperture, intermittently moving the film two frames forward and projecting both pictures, moving the film back one frame and projecting a previously advanced and projected picture, and continuing the method throughout the length of the film.

2. The method set forth in claim 1 including the stopping of the film while a frame is being projected.

3. The method of producing motion pictures which consists of projecting a picture at the light aperture, intermittently moving the film, a plurality of frames forward and successively projecting the advanced frames, moving the film intermittently backwards a predetermined number of frames, and projecting the frames previously advanced and moved backwards, and continuing these steps throughout the length of the film.

4. The method of producing motion pictures which consists of projecting a picture at the light aperture, intermittently moving the film, a plurality of frames forward and successively projecting the advanced frames, moving the film intermittently backwards a less number of frames than were moved forward, projecting the frames previously advanced and moved backwards, and continuing these steps throughout the length of the film.

5. The method set forth in claim 4 including a stopping of the film while a frame is being projected.

6. The method of motion picture projection consisting of moving a film strip towards and withdrawing it from a projection aperture at a given speed, intermittently moving that portion of the film which is adjacent the aperture backward and forward the pitch of at least one frame, and projecting the picture frames successively at the aperture during the intermissions between the movements.

7. The method of motion picture projection consisting of moving a film strip toward and withdrawing it from a projection aperture at a given speed, the portion of the film adjacent the aperture being reversed in movement the pitch of at least one frame and projected, and then advanced to the next frame and projected.

8. The method of motion picture projection consisting of moving a film strip towards and withdrawing it from a projection aperture at a given speed, intermittently moving the portion of the film which is adjacent the aperture backward and forward at a speed that positions a greater number of frames at the aperture than during said given speed, and projecting the picture frames successively at the aperture during the intermissions between the movements.

ALEXANDER FERDINAND VICTOR.